June 24, 1941.  C. P. COE  2,246,574
FLEXIBLE AND SUBMERSIBLE DECOY RACK
Filed Feb. 29, 1940  2 Sheets-Sheet 1
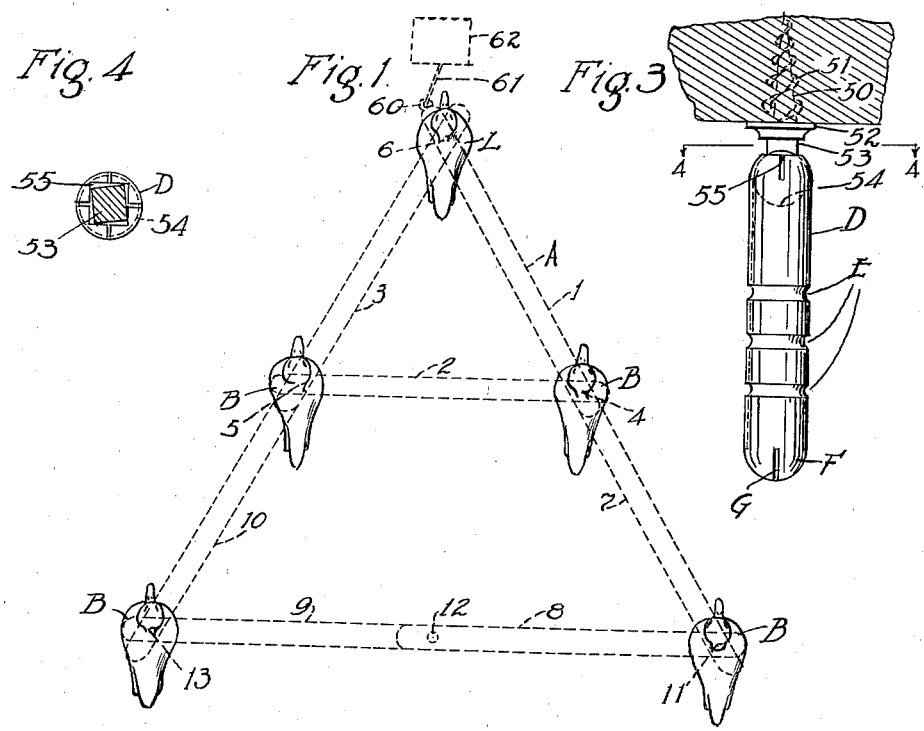
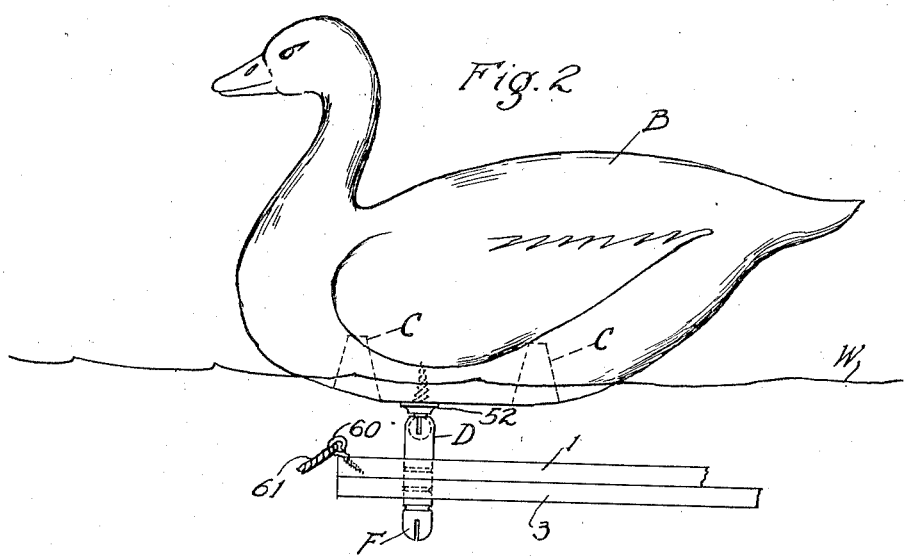
INVENTOR
Clifford P. Coe.
BY
ATTORNEY.

June 24, 1941.                 C. P. COE                  2,246,574
                  FLEXIBLE AND SUBMERSIBLE DECOY RACK
                     Filed Feb. 29, 1940        2 Sheets-Sheet 2
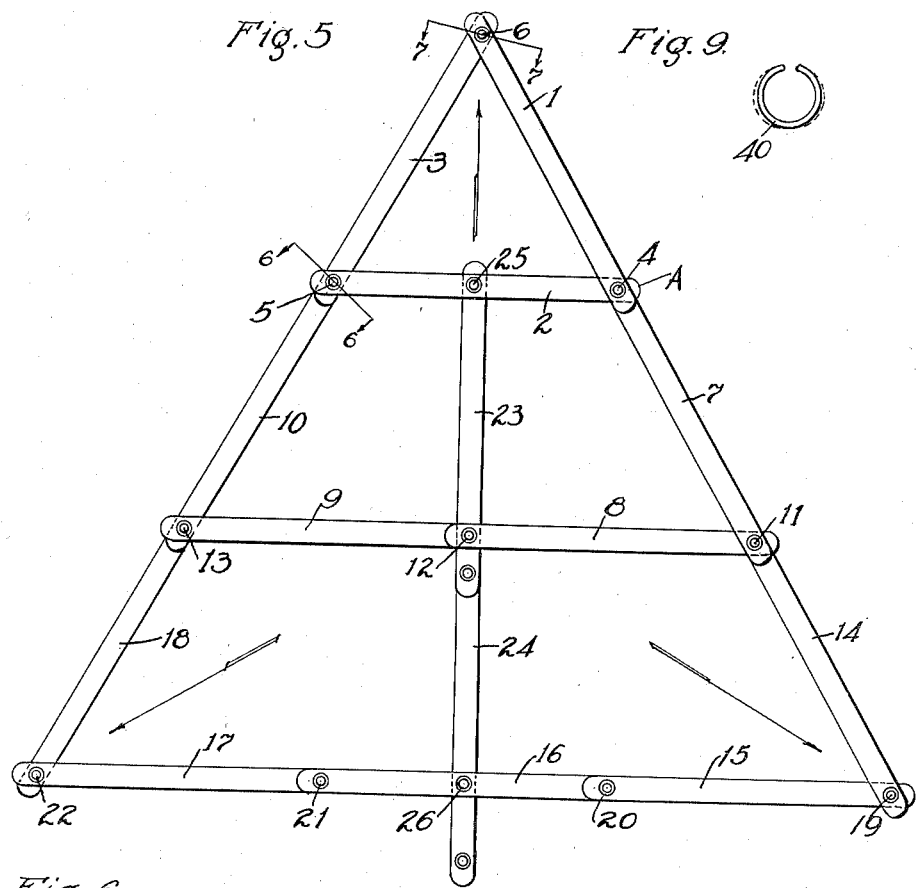
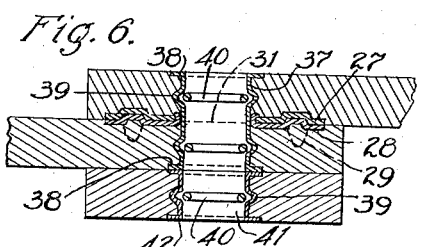
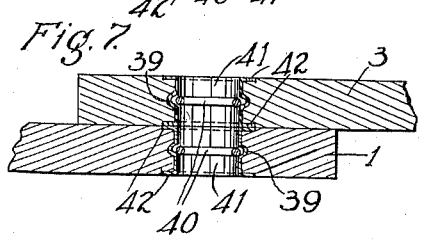
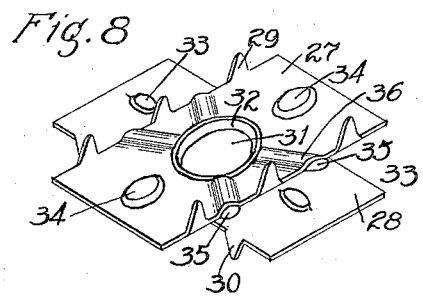
INVENTOR.
Clifford P. Coe.
BY
ATTORNEY Patented June 24, 1941

2,246,574

UNITED STATES PATENT OFFICE 2,246,574

FLEXIBLE AND SUBMERSIBLE DECOY RACK

Clifford P. Coe, St. Paul, Minn.

Application February 29, 1940, Serial No. 321,465

12 Claims. (Cl. 43—3)

My invention relates to decoy racks in which the natural V formation for the placement of decoys is possible.

My invention has for its object, an improved submergible and collapsible rack adapted to be quickly and easily folded into a small and compact form, or unfolded with unerring accuracy to form true V formations for decoys.

It has for its object likewise to provide an improved submergible decoy rack adapted to receive the locking pin means for the decoy to the rack and likewise locking the unit frame members of the rack.

It likewise has for its object a decoy rack that is submergible and of sufficient flexibility to conform with the wave motion of the body of water upon which the rack has been placed.

While the decoy rack is composed of a series of similar units turnably connected to construct an equilateral triangle upon the locking of the first unit ends, additional rows of decoys may be added by the addition of similarly hinged units in which each succeeding row would call for one additional unit length, namely, the first element being composed of three units, the second composed of four units, the fourth of five units, etc., permitting a three unit set up to place three decoys, the seven unit set up for five or six decoys, etc.

The invention consists of the novel devices and combination of devices hereinafter described and defined in the claims. In the accompanying drawings which illustrate the invention, like characters indicate like parts through the several views.

Figure 1 is a schematic bird's eye view of the floating decoys and rack, in which the perfect V formation is shown.

Figure 2 is a side elevation of a decoy showing its fastening means to the rack and the submersion of the rack.

Figure 3 is a side elevation of the depending ball and socket jointed locking pin rockably locking the decoy upon the rack.

Figure 4 is a plan section taken on the line 4—4 of Figure 3 showing a possible small variance of direction permitted the decoys in their locked position.

Figure 5 is a plan view of a twelve unit decoy rack with a centralized stay which prevents any possible misalignment of units composing the V.

Figure 6 is a sectional view taken on the line 6—6 of Figure 5 showing the alignment of the units for the triple connection.

Figure 7 is a sectional view taken on the line 7—7 of Figure 5 showing the alignment of the units for the double connection as of the head end portion.

Figure 8 is a perspective view of the turnable and lockable union used to connect the intermediate units of each section.

Figure 9 is a top view of the split lock ring.

In referring to the drawings it will be noted that the rack is composed of units that are alike in size and construction. While the assembled sections are all provided with tail ends, the intermediate units are turnably connected one upon the other, and turnable to an angular formation, a straight line or may be collapsed as a foldable measure.

In referring to the drawings, A represents a rack of which the first section is composed of three unit members 1, 2 and 3, each being provided with foldable unions at 4 and 5, while the tail end pieces are provided with single unit ring lock bushings 41. The center of all the connecting union or turnable unions are provided with double ring bushings 37 of an equal diameter to the single ring lock bushings 41 in the tail end pieces.

Other units may be added to the first triangle section by the adding of a section composed of the units 7, 8, 9 and 10 which are turnably jointed at 11, 12 and 13 and permit the tail end piece units 7 and 10 to be secured to the first triangle. These tail end units 7 and 10 are similarly equipped to the tail pieces 1 and 3, that is, with single unit lock bushings.

A third section may be added to the first two sections by the additional units 14, 15, 16, 17 and 18. While the unit connections at 19, 20, 21 and 22 are similar to the connections 11, 12 and 13. The ends of the tail piece units 14 and 18 at the connections 11 and 13 are similarly equipped as the unit ends of 7 and 10 at 11 and 13.

At mid-position of the unit 2 there is provided a connecting member 23 to stay and position the members 8 and 9 and another connecting member 24 extending the locking and positioning stay to the unit 16. The members 23 and 24 are secured to the undersides of the bases of the triangles through the locking connections at 25, 12 and 26.

The lockable union connecting the several units of each section is composed of a top member 27 and a bottom member 28 turnable upon a common point. The top member 27 is provided with a series of teeth 29 which when pressed into the unit at the predetermined point affords means to assemble the section rigidly and securely. The bottom member 28 is likewise provided with a series of teeth 30 which when pressed into a companion unit to the first above mentioned will become rigidly secured thereto.

The top member 27 of the union is further provided at its center with an orifice 31 of such size as will permit the upturning of the orifice flange 32 of the bottom member 28 so as to lock the two members 27 and 28 together, as is best illustrated in Figures 6 and 8.

The union member 28 is further provided with a series of upward extending knobs or buttons 33 which align and lock themselves within the raised knobs or buttons 34 within the top member 27. The union member 28 is further provided with an angle position locking series of upward extending surfaces 35 which cooperate with the locking ribs 36 similarly placed in the top member 27. The orifice 31 of the union members 27 and 28 is provided with an open cylindrical bushing 37. The bushing 37 is in turn provided with surface flanges 38 and expanding lock spring recesses 39 into which there are loosely placed the locking spring rings 40.

The tail ends of the several sections of units are provided with single ring cylindrical bushings 41 which in turn, by means of their surface flanges 42, lock the bushing rigidly into place. These bushings 41 are likewise provided with a lock ring 39 for the expansion and reception of the spring lock ring 40.

Figure 1 shows a bird's eye view of a series of five decoys in perfect V formation upon a submerged rack and which is composed of seven individual units with the decoys being placed upon the juncture points 6, 4, 5, 11 and 13.

The decoys B are constructed of some floatable material and may be counterweighted by counterweights C so as to give an even keel to the decoys.

A trifle ahead of the center of gravity, in the base of the decoy, there is made fast a screw 50 with a screw thread 51, a base flange 52, a square neck 53 terminating in a ball 54. This ball 54 is snapped into the squared spring orifice 55 of the connecting lock pin D. The locking pin D is further provided at predetermined points with a series of indentures E and a rounded bottom end F, formed with a spring slot G to assist in assembly.

The ball suspending neck 53 as previously stated is square in its formation and of a predetermined size. The lock pin member D is likewise provided with a squared spring like opening 55 of a trifle larger size than the neck 53, which affords the latter a slight movement, giving a slight variation in the decoy's floating direction. The depressions E on the lock pin D are so spaced as to conform with the placement of the lock rings 40 held within the several spring ring cylinders.

In assembling a rack, the members 1, 2, and 3 are bent upon their unions 4 and 5 so as to form an equilateral triangle. The tail end bushings 41 within the tail ends are brought together so as to align with each other. The lock pin D of the lead decoy is then thrust into the bushings at the juncture point 6 and thereby locking the first unit. The second unit may now be added by bending the tail members 7 and 10 at the predetermined angles and unfolding the members 8 and 9 so that they present a straight line through the foldable union 12. The bushings 41 in the ends of the tail units 7 and 10 will align themselves under the bushings 40 at the points 4 and 5 and permit the insertion of the lock pin D with their decoys at the points 4 and 5 to this assembly.

The next unit may be added through similar procedure in straightening the members 15, 16 and 17 and bending the members 14 and 18 so that their unit bushings 41 align themselves with the multiple bushing 40 at the junctions 11 and 13 and thereby permitting the insertion of the lock pin D with the attached decoy into these places. The lock pins D with their decoys may then be inserted at points 19 and 22.

The rack at the leader decoy L's station is provided with a screw eye 60 into which an anchor cable 61 is made fast. The anchor cable 61 is secured to an anchor 62 whereby the entire element is anchored into floating position upon the water W.

If the lead decoy L is placed to align with the vertex of the triangle, the adjacent two decoys of the first V should be placed to the same alignment. Where several sets of V's are employed upon a rack, various directions of V's are possible; namely, as indicated by arrow in Figure 5 which suggests the placement of the decoys upon the frame in three independent positions.

While the framework inclusive of its interconnecting unions is light and flexible, the added weight of the decoys upon their set positions keep the frame submerged to a sufficient depth to make it invisible, yet affording a sufficiently strong and flexible means for distancing decoys in true V formation.

I claim:

1. In a submergible decoy rack, the combination of a rack and a decoy having a depending ball and socket jointed locking pin, and spring locking means for the pin in said rack to receive said decoy with its depending locking pin, substantially as set forth.

2. In a submergible decoy rack of the class described, the combination of a rack and a decoy having a depending ball and socket jointed locking pin, said ball and socket jointed locking pin being provided with a squared socket opening larger than the squared neck sustaining said ball so as to permit a slight variable movement of the decoy, equal to the angular difference between the squared socket opening of the pin and the squared neck of said ball.

3. In combination with a decoy rack, a decoy, a depending ball and socket jointed rack locking pin, comprising a screw head member, a squared neck member, a depending ball member, a cylindrical pin socket member to receive said ball member, said socket being provided with a squared spring opening to receive and hold said ball member of the decoy's depending rack locking pin.

4. In combination with a decoy rack, a decoy, a depending ball and socket jointed rack locking pin, comprising a screw head member, a squared neck member, a depending ball member, a cylindrical pin socket member to receive said ball member, said socket being provided with a squared spring opening to receive and hold said ball member of the decoy's depending rack locking pin and a series of locking recesses in the cylindrical pin member.

5. A foldable rack composed of equal lengthed units foldable to an equilateral triangle, a position locking union between members, a locking means for tail end members and an angle extension, each section to the length of one additional unit over the preceding section.

6. A foldable rack composed of equal lengthed units foldable to an equilateral triangle, a turnable position locking union between members, a locking means for tail end members, equilateral extension sections each to the length of one additional unit over the preceding section and a vertex tie member locking the bases of the equilateral triangles and rack.

7. A submergible decoy rack of the class described comprising a decoy, a series of equal lengthed units, lock spring bushings positioned in the tail ends of said units, turnable position locking unions interconnecting said units, lock spring bushings sustained within the turnable unions and a ball and socket locking pin depending from the base of a decoy cooperating with the lock spring bushings positioned within the rack.

8. In a submergible decoy rack consisting of a foldable rack composed of equal length units, each unit consisting of foldably connected members, turnable locking unions between members of each unit, means supporting decoys upon said unions, and means permitting both vertical and horizontal tilting movements of said decoys upon said unions.

9. In a submergible decoy rack consisting of units foldably connected, each unit consisting of foldably connected members, turnable locking unions connecting the members of each unit, and means carried by said locking unions for supporting decoys, said decoy supporting means permitting sidewise and forward limited tilting of said decoys with reference to said unit.

10. A submergible decoy rack comprising a plurality of foldable units, each unit being formed of foldable members, pins connecting said units and the members of said units, supporting means for decoys in connection with said pins, said supporting means supporting said decoys for vertical and horizontal tilting movement, and means limiting the amount of movement of said decoys.

11. A submergible decoy supporting rack comprising foldable connected members, locking pin assembly unions connecting said members and forming supports for decoys, and means forming a part of said assembly unions permitting vertical and horizontal tilting of said decoys upon said assemblies, and means for limiting the amount of turning movement of the decoys upon the assemblies for the purpose set forth.

12. A submergible decoy supporting rack consisting of a rack unit comprising foldably connected members, decoy supporting means at the connected portions of said members, said supporting means including locking assemblies holding supported decoys in position spaced above the rack and permitting a limited vertical and horizontal tilting movement in relation to the rack.

CLIFFORD P. COE.